United States Patent [19]

Campbell

[11] 4,004,230
[45] Jan. 18, 1977

[54] CRITICAL PARAMETER RECEIVER TESTER

[75] Inventor: Kenneth J. Campbell, Solana Beach, Calif.

[73] Assignee: The United States of America as represented by the Secretary of the Navy, Washington, D.C.

[22] Filed: Dec. 29, 1975

[21] Appl. No.: 644,410

[52] U.S. Cl. .............................. 325/363; 324/77 R; 332/39; 325/133; 325/67; 324/57 N
[51] Int. Cl.² ........................................ H04B 17/00
[58] Field of Search ............. 325/363, 67, 31, 133, 325/134, 476, 477, 478; 324/77 R, 77 A, 77 E, 57 N, 57 SS; 332/38, 39; 179/1 P, 175.3 R

[56] References Cited

UNITED STATES PATENTS

| | | | |
|---|---|---|---|
| 2,959,672 | 11/1960 | Haise | 325/363 |
| 2,988,693 | 6/1961 | Billig et al. | 325/363 |
| 3,258,689 | 6/1966 | Bessler et al. | 324/57 N |
| 3,287,646 | 11/1966 | Taylor | 324/57 N |
| 3,302,116 | 1/1967 | Free | 324/57 N |
| 3,965,417 | 6/1976 | Tompkins | 324/77 R |

Primary Examiner—Robert L. Griffin
Assistant Examiner—Tommy P. Chin
Attorney, Agent, or Firm—R. S. Sciascia; G. J. Rubens; T. M. Phillips

[57] ABSTRACT

A modulated signal is injected into receiver under test. The output of the receiver is fed directly to a first power measuring device and through a digital filter to a second measuring device. The two measured quantities are fed to a divider circuit which provides an output proportional to signal to signal and noise ratio.

6 Claims, 1 Drawing Figure

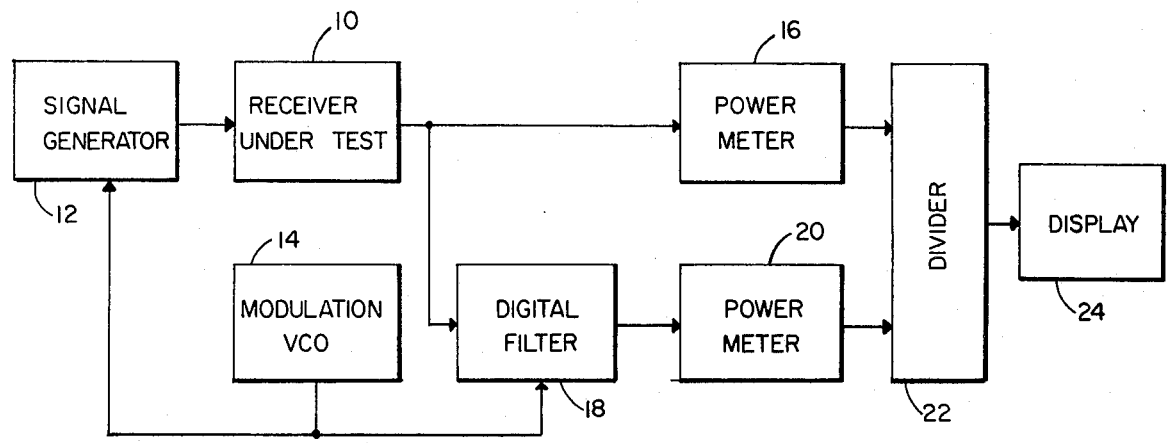

CRITICAL PARAMETER RECEIVER TESTER

BACKGROUND OF THE INVENTION

Present techniques of evaluating critical receiver parameters, i.e., sensitivity, bandpass characteristic (selectivity) and operating frequency, utilize a large RF signal generator in conjunction with a frequency meter, oscilloscope, and power meter. These manual techniques follow relatively complex procedures requiring high time expenditure by well trained personnel. The adaptability of these types of systems to computer control are complex and expensive.

SUMMARY OF THE INVENTION

The present invention provides for a simple yet effective means of evaluating critical receiver parameters, i.e. sensitivity, bandpass characteristics (selectivity), and operating frequency by injecting a modulated signal into the receiver under test. The output of the receiver then is fed directly to a first power measuring device and through a digital filter to a second power measuring device. The two measured quantities are fed to a divider circuit which provides a output proportional to the ratio of signal to signal plus noise.

Accordingly, an object of the present invention is to provide a simple yet effective means of evaluating critical parameters of radio frequency receivers.

Another object of the invention is the provision of a simple yet effective means of evaluating critical receiver parameters which is easily adaptable to automated testing techniques i.e., computer control.

Other objects and many of the attendant advantages of this invention will be readily appreciated as the same becomes better understood by reference to the following detailed description when considered in connection with the accompanying drawings.

BRIEF DESCRIPTION OF THE DRAWINGS

A preferred embodiment of the invention in block diagram form is shown in the single FIGURE.

DESCRIPTION OF THE PREFERRED EMBODIMENTS

A receiver unit 10 which may be AM, FM, DSB, or SSB is injected with a type of modulation appropriate to the receiver unit under test by a signal from signal generator 12. Modulation control of the signal from signal generator 12 is accomplished by means of a voltage controlled oscillator 14. The signal out of receiver 10 is fed directly to power measuring device 16 and through a digital filter 18 to a second power measuring device 20. The two outputs from power measuring devices 16 and 20 are fed to a divider circuit 22 which provides an output to display 24.

In operation, signal generator 12 should be adjusted to generate an RF signal at the same frequency to which receiver 10 is tuned. Signal generator 12 may be a conventional signal generator, e.g., Hewlett-Packard, Model 606 or Model 608, which generates one discrete frequency, or it may be a comb frequency type RF generator such as disclosed in my co-pending application Ser. No. 622,925, filed Oct. 16, 1975, entitled "Signal Generator Using Step Recovery Diode". The RF signal generated is modulated by a sine wave provided by the voltage control oscillator 14. Modulation percentage in the case of AM or frequency deviation in the case of FM is determined by the amplitude of the sine wave. Modulation frequency is determined by and equal to the frequency of the sine wave.

In operation, the signal generator 12 output level is set to some convenient level, and the oscillator 14 is adjusted to sweep over an appropriate frequency range. Thus a constant level of RF signal with varying modulation frequency is applied to the input of receiver 10 under test.

If receiver 10 is operating properly and is tuned to the desired frequency, the RF signal applied at its input will then be amplified and detected and appear at the receiver 10 audio output. The audio output from receiver 10 is fed to power measuring device 16 and to the digital filter 18. Power measuring device 16 should be a true RMS responding device such as Burr-Borwn Model 4128 and will measure the amount of power present at the output of the receiver under test. This output level measured correspond to the signal plus noise power (S + N) present. The output of measuring device 16 is fed to divider 22.

Digital filter 18 should be a very high Q filter and may be of the commutating type which passes only the frequency to which it is tuned. Tuning is accomplished by applying a sine wave whose frequency is equal to the desired tuning frequency. This sine wave is provided by voltage control oscillator 14. Since the same oscillator determines both the RF signal modulation frequency and the digital tuning frequency, digital filter 18 will always be tuned to the modulation frequency.

The output of receiver 10 under test, which contains both signal and noise components, is fed to digital filter 18 where only the signal component is allowed to pass. This signal component is fed to power measuring device 20 which may be identical to the power measuring device 16 where a voltage proportional to the signal component power level is produced. The output voltage developed by this device is fed to divider 22. Divider 22 provides an output voltage proportional to the signal-to-signal plus noise power ratio (S/S+N), present at the output of the receiver 10. The output voltage from divider 22 may be fed to a display which may be a meter calibrated to indicate signal-to-signal plus noise ratio present at the output of the receiver under test.

In operation, as the modulation frequency of voltage controlled oscillator 14 is caused to vary, the above described circuitry automatically and continuously measures and displays the signal-to-signal plus noise ratio (S/S+N) at the output of the receiver under test.

Since a receiver is considered to be a linear device, this information may be expressed differently in equivalent formats. Specifically knowing the output level of the signal generator 10, and the resultant signal to signal plus noise ratio at the output of the receiver 10, conversion to the signal level required to generate a 10db signal plus noise-to-noise (S+N/N) ratio may be effected. This is the standard format for receiver sensitivity measurements, and is usually stated at some standard modulation frequency. Display 24 then could be calibrated to reflect whatever units of measurements may be desired.

If this sensitivity measurement were plotted as a function of modulation frequency i.e., the output of oscillator 14, a curve describing the overall bandpass characteristic, i.e., selectivity, of the receiver under test would be obtained. In this case a more suitable format would be the DBM signal level required to generate a constant signal-to-signal plus noise ratio, where an absolute DBM difference at various modulation frequencies would denote relative attenuation.

Obviously many modifications and variations of the present invention are possible in the light of the above teachings. It is therefore to be understood that within the scope of the appended claims the invention may be practiced otherwise than as specifically described.

What is claimed is:

1. A method of measuring critical parameters of a receiver, which comprises:
   a. injecting into the receiver a signal of a frequency to which the receiver is tuned,
   b. measuring the power output of the receiver directly,
   c. filtering the output of the receiver to eliminate all frequencies in the output signal except the frequency to which the receiver is tuned,
   d. measuring the power of the filtered signal,
   e. dividing the measured power of the filtered signal by the measured power of the receiver output to obtain a ratio of signal-to-signal plus noise.

2. A system for measuring critical parameters of a receiver comprising:
   a. signal generator means for generating a test signal,
   b. a receiver to be tested having its input coupled to said signal generator for receiving the test signal,
   c. a first power meter coupled to the output of said receiver for measuring the output power,
   d. filter means tuned to the frequency of said test signal coupled to the output of said receiver for allowing only signals to which it is tuned to pass,
   e. second power meter means coupled to said filter for measuring the output power,
   f. divider circuit means coupled to said first and second power meter means for providing an output signal proportional to the quotient of the output signals from said first and second power meters.

3. The system of claim 2 wherein said filter means is a digital filter.

4. The system of claim 3 and further comprising a modulation signal source coupled to said signal generator means for modulating the test signal.

5. The system of claim 4 wherein said modulation signal source is coupled to said digital filter for tuning said filter to the same frequency as said test signal.

6. The system of claim 5 wherein said modulation signal source is a voltage controlled oscillator.

* * * * *